United States Patent [19]
Becker et al.

[11] Patent Number: 5,574,616
[45] Date of Patent: *Nov. 12, 1996

[54] DEGAUSSING TECHNIQUE

[75] Inventors: Donald G. Becker; David J. Etherton, both of Lincoln, Nebr.

[73] Assignee: Garner Industries, Inc., Lincoln, Nebr.

[*] Notice: The term of this patent shall not extend beyond the expiration date of Pat. No. 5,416,664.

[21] Appl. No.: 437,168

[22] Filed: May 8, 1995

Related U.S. Application Data

[63] Continuation-in-part of Ser. No. 996,674, Dec. 24, 1992, Pat. No. 5,416,664, which is a continuation-in-part of Ser. No. 870,476, Apr. 17, 1992, Pat. No. 5,204,801.

[51] Int. Cl.$^6$ ............................................. H01F 13/00
[52] U.S. Cl. ....................... 361/149; 361/151; 361/267
[58] Field of Search ............................... 361/149, 151, 361/267

[56] References Cited

U.S. PATENT DOCUMENTS

| | | | |
|---|---|---|---|
| 4,423,460 | 12/1983 | Jackson et al. | 361/151 |
| 4,639,821 | 1/1987 | Littwin et al. | 361/151 |
| 4,751,608 | 6/1988 | Schultz | 361/151 |
| 4,897,759 | 1/1990 | Becker | 361/151 |
| 5,198,959 | 3/1993 | Scholtysik et al. | 361/149 |
| 5,204,801 | 4/1993 | Becker et al. | 361/151 |
| 5,270,899 | 12/1993 | Saito | 361/151 |
| 5,416,664 | 5/1995 | Becker et al. | 361/149 |

*Primary Examiner*—Fritz M. Fleming
*Attorney, Agent, or Firm*—Vincent L. Carney

[57] ABSTRACT

To degauss cassettes of magnetic tape, a magnetic field is applied to the magnetic material while the magnetic material moves with respect to the field in a single air gap of a flux density of at least 1,000 gauss and at an angle between 20 degrees and 70 degrees from the horizontal of the magnetic tape for a time priod of at least one second and the field is alternated at a frequency of at least ten hertz. The magnetic material may be rotated while it is in the field.

12 Claims, 3 Drawing Sheets

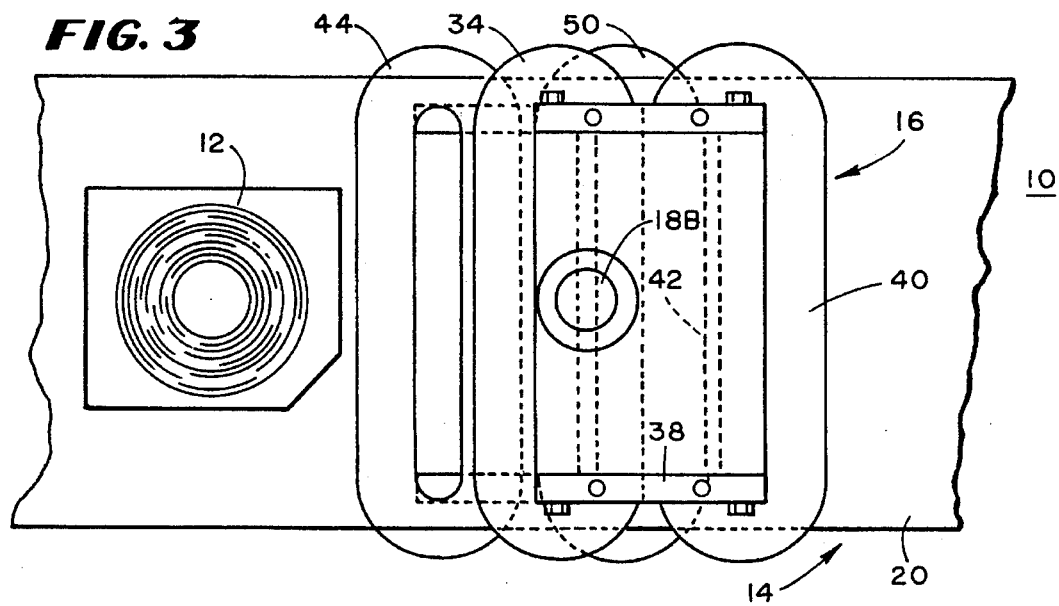
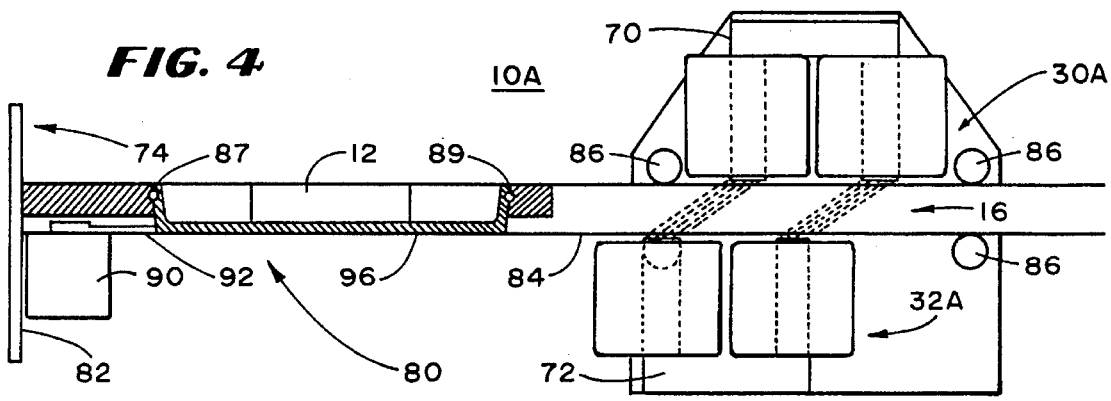
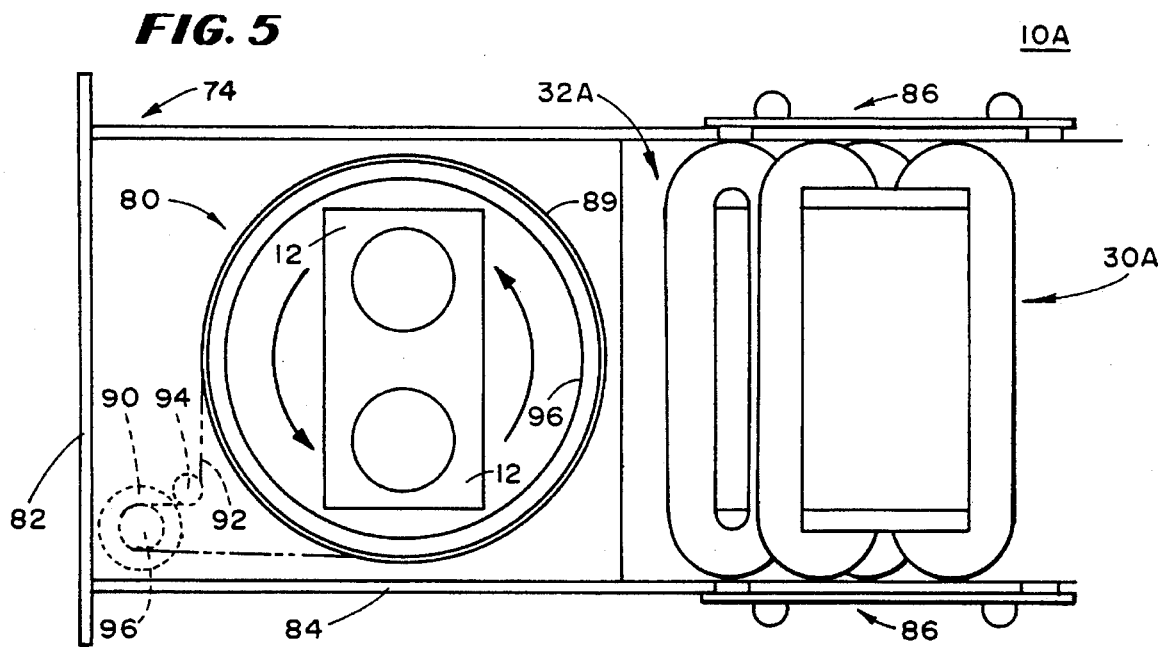

DEGAUSSING TECHNIQUE

RELATED CASES

This application is a continuation-in-part of application Ser. No. 07/996,674 filed Dec. 24, 1992, now U.S. Pat. No. 5,416,664 which is a continuation-in-part of U.S. application Ser. No. 07/870,476, filed Apr. 17, 1992, in the names of Donald Gene Becker and David Joseph Etherton, now U.S. Pat. No. 5,204,801 issued Apr. 20, 1994, and assigned to the same assignee as this application.

BACKGROUND OF THE INVENTION

This invention relates to methods and apparatuses for erasing information from a magnetic recording medium and to improved electromagnets for that purpose.

In one class of methods and apparatuses for erasing information from magnetic recording media, the recording medium, which may be a magnetic tape wound about a reel, is subjected to a varying or alternating electromagnetic field to randomize the magnetic particles on the magnetic material.

In one prior art method and apparatus in this class, the magnetic tape is moved into an electromagnetic field that is applied in each of a plurality of different directions, one direction at a time, such as by first applying a vertically oriented field followed by a longitudinally oriented field. Techniques of this type are described in U.S. Pat. No. 4,730,230 and U.S. Pat. No. 4,751,608.

In another prior art technique, the magnetic tape is carried by a conveyor over a rotating electromagnet that has pole faces parallel to each other in the same plane underneath the conveyor belt. Thus, the electromagnet rotates a time varying electromagnetic field with it to cause the time varying electromagnetic field to pass through the magnetic material in the tape at a plurality of different angles. This type of prior art device is disclosed in U.S. Pat. No. 4,639,821.

Still another prior art apparatus and technique of this class includes a conveyor that carries a magnetic tape into a rotating magnetic field. The rotating magnetic field is substantially parallel with the conveyor and is in the plane of the magnetic tape. It is created by electromagnetic poles on both sides of the conveyor belt, energized in such a way that similar polarities oppose each other on opposite sides of the tape with the phases of the poles on each side of the conveyor changing in synchronism to cause the field to rotate. Thus, north electromagnetic poles face each other on opposite sides of the tape and south magnetic poles face each other on opposite sides of the tape and the north and south poles alternate with each other in the same plane on the same sides of the tape. The poles rotate in synchronism.

The prior art degaussing techniques provide erasure that is satisfactory for some purposes but do not erase to the extent desired for other applications. In general, the systems which apply vertical and longitudinal fields separately have the disadvantage of moving the energy back and forth between even and odd harmonics of the recorded signal. This reduces the effectiveness of the erasure. Rotational fields by themselves do not improve the depth of erasure to the extent needed for some applications when practiced as described in the aforementioned prior art references.

SUMMARY OF THE INVENTION

Accordingly, it is an object of the invention to provide a novel degaussing apparatus and method.

It is a further object of the invention to provide a novel technique for applying an alternating current, electromagnetic field to a magnetic medium.

It is a still further object of the invention to provide a technique for increasing the depth of erasure of information recorded on a magnetic medium over other techniques for erasing recorded information from a magnetic medium without increasing the magnetic flux density.

In accordance with the above and further objects of the invention, a magnetic field vector is applied through a tape cassette at an angle of between 20 to 70 degrees to the direction of the orientation of magnetic domains on the medium, or of course, the supplement of the angles in this range. For the common longitudinally recorded magnetic tape, the field vector is between 20 to 70 degrees from the longitudinal axis of a strip of the tape. For a cassette having this orientation of recorded information, the field may be applied at an angle of between 20 to 70 degrees to the larger flat sides of the cassette. Generally, if this is done, the field is rotated about an axis that is perpendicular to the flat sides of the cassette so that all sections of the tape receive a vector with a proper orientation at some time during the rotation of the field. The alternating field is applied at a sufficient magnetic flux density to change the orientation of individual magnetic domains or particles and thus randomize the orientation.

The field is applied parallel to a plane that is: (1) at an acute or obtuse angle to the longitudinal direction of the tape; and (2) at an obtuse or acute angle to the side-to-side direction of the tape. Thus, the field vector is not perpendicular to the direction of magnetization (which is generally along the longitudinal axis of the tape) nor is the field vector in the direction of magnetization. However, it has vertical and longitudinal components that are simultaneously present at the same point in the tape.

The angle is selected so that when resolved into components, the magnetic flux density has a vertical component nearly equal to or less than that of the longitudinal component. Keeping the ratio of vertical component to longitudinal component (the tangent of the vector angle) between 2.7 and 0.36 prevents energy transfer between even and odd harmonics of the recorded signal during degausing and results in even erasure of all harmonics. Preferably, angle is selected so that the signal fundamental and all harmonics are reduced below a desired degauss level. In the preferred embodiment, the angle is approximately 45 degrees from the horizontal and the reel is rotated as it is moved linearly through the field.

It can be understood that the degausser of this invention has the advantage of providing a greater amount of erasure with the same flux density than other techniques which apply fields in different directions in different stages or apply them directly or predominantly in the direction of magnetization or normal to the direction of magnetization.

SUMMARY OF THE DRAWINGS

The above noted and other features of the invention will be better understood from the following detailed description when considered with reference to the accompanying drawings in which:

FIG. 3 is a top view of the embodiment of FIG. 1;

FIG. 4 is a fragmentary, side elevational view of another embodiment of the invention;

FIG. 5 is a top view of the embodiment of FIG. 4;

DETAILED DESCRIPTION

Figure 1:
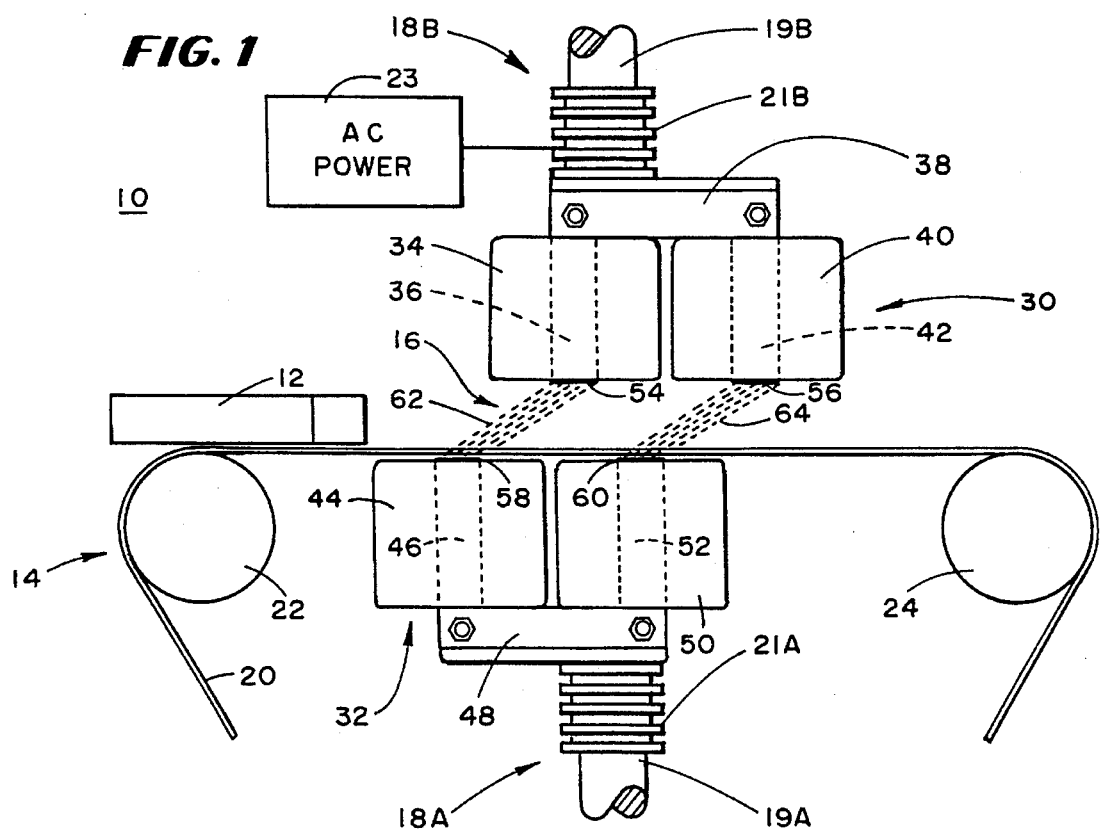
FIG. 1 is a fragmentary, side elevational view of a degaussing apparatus and tape to be degaussed in accordance with an embodiment of the invention.
Figure 2:
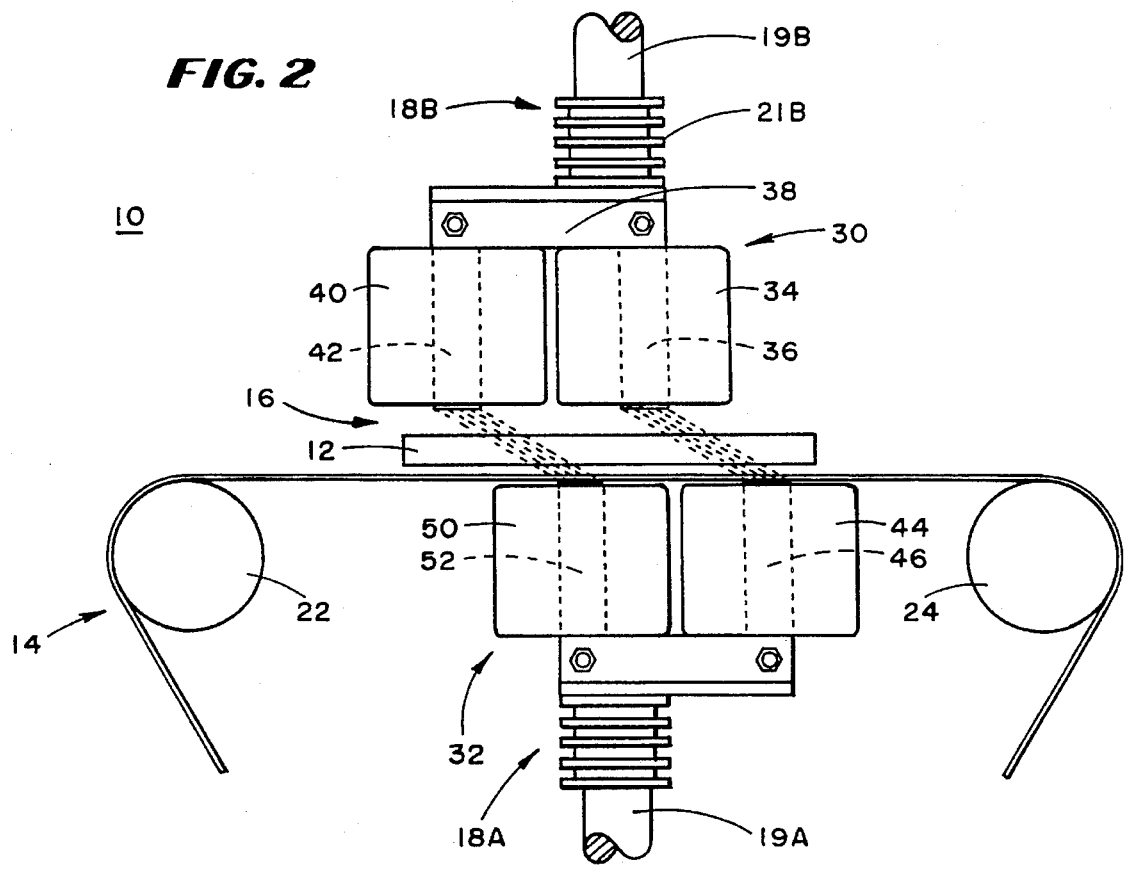
FIG. 2 is another fragmentary, side elevational view of the degaussing apparatus of FIG. 1 in another state of its progression during degaussing.

In FIGS. 1 and 2, there is shown a fragmentary, simplified sectional view of a degausser 10 in the process of receiving and degaussing a magnetic tape cassette 12 containing magnetic tape for degaussing. The degausser 10 includes a source of a magnetic field 16, a conveyor assembly 14 for delivering the magnetic tape cassette 12 into the magnetic field 16, and a system shown at 18A and 18B for causing the field 16 and/or the cassette 12 to rotate with respect to each other. FIG. 1 shows the tape 12 entering the degaussing apparatus and FIG. 2 shows the tape 12 within the field.

The source 16 of the magnetic field is positioned with respect to the conveyor so that when the cassette 12 is moved into the field, the source 16 creates a field at an angle to the side of the cassette 12 that is in the range of 20 to 70 degrees, and in the preferred embodiment, 45 or fewer degrees. This angle is referred to in this specification as the "effective angle". FIG. 1 shows one effective angle from one side and FIG. 2 shows a different effective angle that is the supplement of the effective angle shown in FIG. 1. It is desirable for the domains of the tape to receive peak or substantially a peak field strength at both the effective angle and its supplement.

In using the effective angle, a magnetic field vector is applied through the tape at an angle of between 20 to 70 degrees from the longitudinal side edges of the tape. The alternating field is applied at a sufficient magnetic flux density to change the orientation of individual magnetic domains or particles and thus randomizes the orientation.

The field is applied parallel to a plane that is: (1) at an acute or obtuse angle to the longitudinal direction of the tape; and (2) at an obtuse or acute angle to the side-to-side direction of the tape. Thus, the field vector is not perpendicular to the direction of magnetization (which is generally along the longitudinal axis of the tape) nor is the field vector in the direction of magnetization. However, the field vector has components that are simultaneously present in the perpendicular and longitudinal directions.

The effective angle is selected so that when resolved into components, the magnetic flux density has a vertical component nearly equal to or less than that of the longitudinal component. More generally, the ratio of the vertical component to the longitudinal component (the tangent of the vector angle) is preferably between 2.7 and 0.36. This reduces energy transfer between even and odd harmonics of the recorded signal during degausing and results in even erasure of all harmonics. The angle is selected so that during degaussing, the fundamental and all harmonics are reduced below a desired level.

In the preferred embodiment, the angle is approximately 45 degrees from the horizontal and the reel is rotated as it is moved linearly through the field. At 45 degrees, the vertical and longitudinal field components are in equal proportions at a given point in space. Unlike other degaussers in which the magnetic field is applied at a number of angles but at different points in space or time resulting in ineffective degaussing of all harmonics without consideration of the best angle, the degausser 10 applies the magnetic vector at the effective angle preferably all of the time, but at least a sufficient proportion of the time the degausser operates on the magnetic material to be efficient such as for example at least 30 percent of the time the tape is in the field.

Of particular significance is that the field be at the effective angle for the domains to be erased for at least one and one-half cycles and that it be at the effective angle during at least one peak of the alternating current as the tape and field are separated such as when a cassette is moved from a field by a conveyor. The reduction of the field strength from the fringes of the field at the time the tape and field are being separated is particularly effective in erasing the tape.

The conveyor assembly 14 in the embodiment of FIG. 1 includes a belt 20, a first roller 22 and a second roller 24. Either or both of the rollers are drive rollers with the belt 20 passing over them as an endless belt capable of moving the cassette 12 or a series of such cassettes along the top run of the belt 20. Of course, any other means for moving the cassettes with respect to the field may be used.

The source of the magnetic field 16 includes first and second electromagnetic assemblies 30 and 32, respectively. One of the assemblies 32 in the embodiment of FIG. 1 is located close to the top run of the belt 20 and beneath the belt 20 so that the cassette 12 passes over it and the other electromagnetic assembly 30 is located above the top run of the belt 20 at an elevation high enough so that the cassette 12 may pass therebetween.

The first electromagnetic assembly 30 includes a first coil 34, a first core leg 36, a bridging portion 38, a second coil 40 and a second core leg 42. The first and second coils 34 and 40 are respectively wound around the first and second downwardly extending vertical legs 36 and 42 to create a field through them with the bridge 38 connecting the legs 36 and 42 to provide a closed magnetic path, to hold them in position, and to mount them to the means for rotating 18B in fixed relationship with respect to each other. The first core leg 36 ends in a pole face 54 and the second core leg 42 ends in a pole face 56. The legs 36 and 42 are of high permeability metal to concentrate the field at the pole faces 54 and 56 for extension downwardly through a cassette 12 to the second electromagnetic assembly 32.

The second electromagnetic assembly 32 is constructed in a manner similar to the first assembly 34 and includes a first coil 44, a first upwardly extending, core leg portion 46, a bridge 48, a second coil 50 and a second downwardly extending, core leg portion 52. The first leg 46 ends in a pole face 58 and the second leg 52 ends in a pole face 60. The core legs 36, 42, 46 and 52 are parallel to each other with the pole faces 58 and 60 being positioned near the bottom of the bottom rung of the belt 20 and the pole faces 54 and 56 being located at a sufficient height so that the cassette 12 passes under them when carried into position by the belt 20.

The pole faces of opposite polarity on opposite sides of the top run of the belt 20 are off-set from each other so that a field extending between the pole face 54 and 58 and the field extending between the pole face 56 and 60 are at an angle to the cassette 12. That angle is between 20 and 70 degrees so that if the components of the field are resolved into components that are vertical to the cassette 12 and horizontal to it, the vertical component would be 0.36 to 2.7 times the magnitude of the longitudinal component. Thus, the critical angle is formed for the magnetic vector.

The bridges 38 and 48 are preferably of high permeability material and the windings wound in a direction so that the poles alternate north to south. In this case, the poles 58 and 60 are of opposite polarity and the pole 58 has the opposite polarity from the pole 54 so that if 54 is north, 58 is south. In this embodiment, the reluctance path between the poles 54 and 56 and the reluctance of the path between the poles 58 and 60 should be much greater than the reluctance of the path between the poles 54 and 58 and the poles 56 and 60. This may be accomplished by spacing the poles 54 and 56 and the poles 58 and 60 much further from each other than the poles 54 and 58 and the poles 56 and 60 are spaced from each other.

The rotating system portions 18A and 18B are identical to each other and each includes a motor driven shaft which serves to rotate the electromagnetic assemblies in synchronism to maintain the effective angle between the poles 54 and 58 and 56 and 60. For this purpose, the shaft 19B and 19A are connected off-center to the bridges 38 and 48, respectively, to support the bridges and thus, the core legs and windings as they are rotated.

The shafts 19A and 19B are parallel to each other and perpendicular to the bridges 48 and 38 so that the pole faces 54, 56, 58 and 60 remain parallel to the belt 20. Power in this embodiment is electrically connected to the windings through slip rings 21B and 21A connected to a source of A.C. power such as the source 23 shown connected to the slip rings 21B with the shaft 19B adapted to slide with respect to the slip rings and the slip rings being electrically connected to the windings.

In FIG. 3, there is shown a simplified top view of the embodiment of FIG. 1 showing the cassette 12 being carried by the belt 20 into a position where it is between the top positioned coils 34 and 40 and the bottom coils 44 and 50. The windings and conveyor are conventional. The belt 20 and electromagnets 30 and 32 may be fabricated in the manner described in connection with U.S. Pat. No. 4,897,759.

Either the cassette 12 or the electromagnetic assemblies 30 and 32 may be rotated since it is the motion between the two that is significant and similarly the tape 12 may be moved between the assembly or the assembly moved over the tape 12. Moreover, instead of physically rotating the electromagnets 30 and 32, a rotating magnetic field may be created, such as that disclosed in U.S. Pat. No. 4,423,460, provided the angular direction of the field as it passes through the cassettes is maintained at the effective angle.

In FIG. 4, there is shown a simplified elevational sectional view of another embodiment 10A of degausser positioned to erase a cassette 12 having a means for moving the cassette 12 and degaussing field with respect to each other for erasing information from the magnetic tape, a means for rotating the tape with respect to the field, and a source of a magnetic field adapted to be applied at an angle to the tape for efficient demagnetization thereof. In this embodiment, the means for moving the cassette and degaussing field with respect to each other is similar to a file cabinet drawer 74 positioned to move with respect to a source of a magnetic field. The drawer 74 in this embodiment includes a drawer door 82, a drawer frame 84 and a drawer roller assembly 86.

The drawer frame 84 supports a rotating means 80 and is connected to the door 82 for moving on the drawer rail and roller assembly 86. The source of the magnetic field 16 (not shown in FIG. 3) is mounted to be stationary with respect to the frame 84 so that the means for rotating the cassette 12 is moved between the first and second electromagnetic assemblies 30A and 32A for demagnetization.

A means 80 for rotating the cassette 12 includes a pan mounted for rotation within the frame 84 by bearings 87 such as along the rim of a circular opening 89 in the bottom of the frame 84. To rotate the cassette 12, a drive motor 90 is connected by a belt 92 to the rim of the pan 96 for rotating about the idler pulley 94 so as to turn the pan. The tape mounts within the pan 96 and is rotated therewith within the field 16. The first and second electromagnetic assemblies 30A and 32A are mounted to the side of the cabinet by frame members 70 and 72 (not shown in FIG. 3).

In FIG. 5, there is shown a plan view of the degausser 10A showing the manner in which cassette 12 is mounted for rotation with the pan 96. The pan 96 as best shown in FIG. 4, is positioned to be rotated by the motor 90, idler pulley 94 and belt 92 to rotate the cassette 12. The electromagnetic assemblies 30A and 32A are identical to those in the embodiment of FIGS. 1 and 2 except that they are mounted to be stationary rather than rotatable.

In each of these embodiments, the tapes may be rotated or not. Slightly better demagnetization is obtained by rotating the tapes, probably because the intensity of the field at the effective angle is evenly distributed by the rotation over the tape around the reel during the rotation. Otherwise, the orientation of the tape within the field could cause some portions to receive less activation than others.

Figure 6:
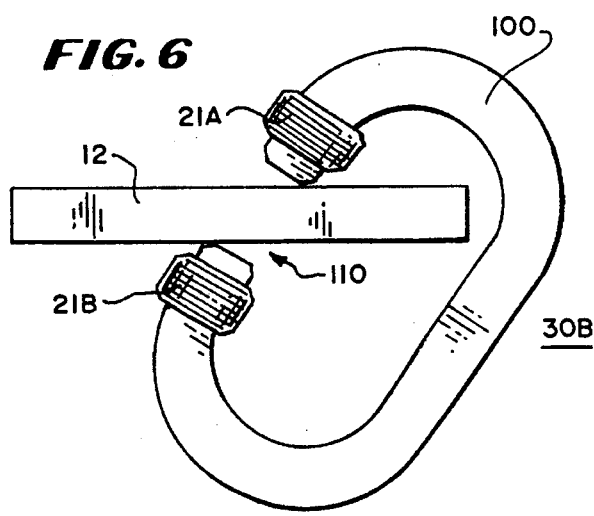
FIG. 6 is a fragmentary, side elevational, schematic view of another embodiment of the invention.

In FIG. 6, there is shown a simplified schematic side elevational view illustrating a novel electromagnetic assembly 30B utilized to demagnetize a cassette 12. In this embodiment, the electromagnetic assembly 30B includes a ferromagnetic core 100 with windings 21A and 21B mounted near the pole pieces to form a single air gap 110 between them. This arrangement is used in a manner analogous to the arrangements of FIGS. 1–5 except that, in the arrangements of FIGS. 1–5, there are two air gaps and the pole pieces rotate with respect to each other.

With two gaps, the total length of the air gaps in the electromagnetic circuit is inevitably longer than in the case of a single air gap, thus increasing the reluctance of the magnetic circuits in the embodiments of FIGS. 1–5 over that of the embodiments of FIGS. 6–9. The single gap of the embodiment of FIGS. 6 and 7 and the two embodiments of FIGS. 8 and 9, permits a shorter air gap and lower reluctance path and thus a lower reluctance circuit. This enables greater field intensity with the same amount of ampere turns and ultimately permits a higher intensity field.

In the embodiment of FIG. 6 a casette and electromagnetic assembly are rotated with respect to each other and moved linearly with respect to each other so that the alternating field within the gap is applied to every segment of the tape at an angle at between 20 and 70 degrees, with the angle when the gap is on one side of the casette being the suppliment of the angle when it is on the other side of the cassette. As in the other embodiments, the entire field is applied to the tape, including the fringe portions of the field.

Figure 7:
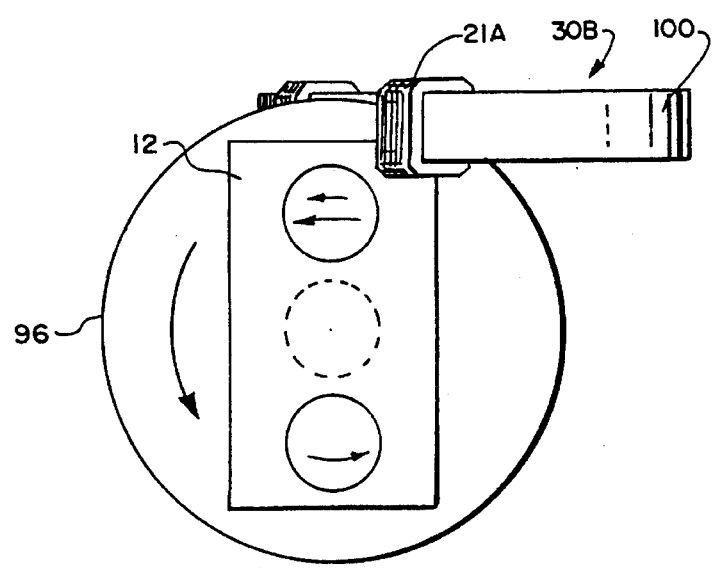
FIG. 7 is a plan view of the embodiment of FIG. 6 shown in schematic form.

In FIG. 7 there is shown a top view of an embodiment similar to that of FIG. 5 but utilizing the electromagnetic magnetic assembly 30B. In the embodiment of FIG. 7 the electromagnetic assembly itself may be moved linearly while the cassette is rotated or the cassette may be moved linearly on a conveyor and rotated within a pan on the conveyor. The relative simplicity of the electromagnetic assembly 30B permits an uncomplicated mechanism for moving the electromagnetic assembly in a cabinet or the like while the tape is rotated on a pan stationary with respect to the housing.

Figure 8:
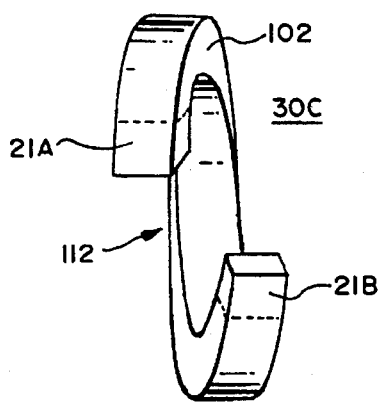
FIG. 8 is a simplified, fragmentary perspective view of another embodiment of the invention.

In FIG. 8, there is shown a simplified perspective view of an electromagnetic assembly 30C having the windings 21A and 21B on the ends of a core 102 to form a gap 112. In the embodiment of FIGS. 6 and 7 the gap 110 is formed by tilting the toroidal electromagnet around its major axis whereas in the embodiment of FIG. 8 the electrical magnetic circuit path is offset to form an air gap so the poles are not directly aligned in the plan of the elliptical core 102. However, the operation of the electromagnetic assemblies of FIGS. 6, 7 and 8 are substantially the same.

Figure 9:
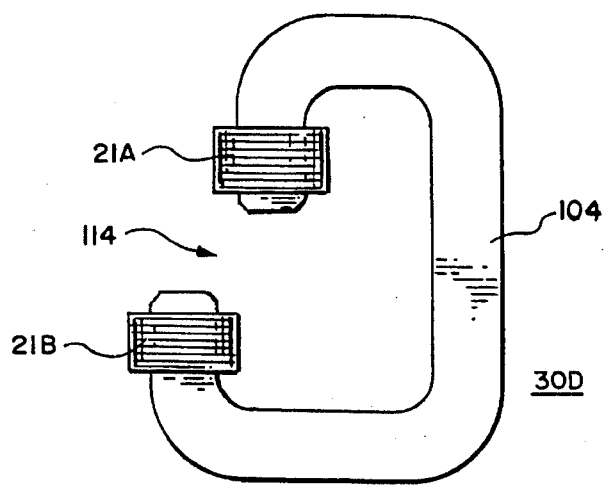
FIG. 9 is a fragmentary side elevational view of still another embodiment of the invention.

Similarly, in FIG. 9, a side elevational view is shown of still another embodiment of electromagnetic assembly 30D having the windings 21A and 21B to form a flex path in a core 104 with a gap 114. However, the gap in this embodiment is formed by offsetting the open ends of the core from each other.

In operation, a cassette or other holder for magnetic tape, is placed either on the conveyor belt 20 in the embodiments of FIGS. 1 and 2 or in the pan 96 in the embodiments of FIGS. 3 and 4. The cassette, or plurality of cassettes, are then moved linearly into an alternating magnetic field which alternates at a frequency of approximately 60 hertz in a field of magnitue proportional to the magnetic coercivity of the cassette tape of other medium to be degaussed. Satisfactory results, however, have been obtained for a reduction of 95 decibels below saturation of a 750 oersted coercivity tape using a field vector of only 2700 gauss.

While a 60 hertz field is generally used, other frequencies may be used within the range of 10 to 400 hertz. The magnetic flux density should be at least two times the tape or medium coercivity. For todays media, the minimum field should be about 1,000 gauss. Generally the higher the field, the better the depth of eraser, but other factors such as inductive heating effects and power loss that increase with higher flux limit the field strength in practical designs.

The tape is rotated in the rotating pan or the magnet assemblies are rotated. The rate of rotation of the tapes, when used, may be as low as 40 revolutions per minute or higher. The linear movement of the tape, such as on a conveyor belt with a plurality of tapes being moved, may be at any convenient speed such as 0.3 inches per second but should be in a range of 0.1 inches per second to two inches per second. The rates of rotation and linear speed are interdependent and are selected prior to the degaussing in conjunction with the depth of erasure needed, the intensity of field that is to be applied and the coercivity of the magnetic medium.

From the above description, it can be understood that the degausser of this invention has several advantages, such as: (1) it is relatively economical and fast in operation because it applies a single field at an effective angle; and (2) it provides a greater level of erasure for the same magnetic flux density than other techniques.

Although a preferred embodiment of the invention has been described with some particularity, many modifications and variations in the invention are possible in the light of the above teachings. Therefore, it is to be understood that, within the scope of the appended claims, the invention may be practiced other than as specifically described.

What is claimed is:

1. A method of degaussing magnetic material comprising the steps of:

applying a magnetic field to the magnetic material while the magnetic material moves with respect to the field in a single air gap of a magnetic path with a flux density of at least 1,000 gauss and at an angle between 20 degrees and 70 degrees; and alternating the field at a frequency of at least ten hertz for a sufficient time so that the flux density of at least 1,000 gauss passes through each portion of the magnetic material having a signal recorded on it at the angle of between 20 degrees and 70 degrees for at least one and one-half cycles of the alternating field.

2. A method in accordance with claim 1 further including the step of rotating at least one of the magnetic material and the field with respect to each other while the magnetic material is in the field.

3. A method in accordance with claim 2 further including the step of moving a plurality of cassettes of magnetic material in succession through the field.

4. A method in accordance with claim 3 wherein the field is at an angle of 45 degrees to the magnetic material.

5. A method according to claim 1 futher including the steps of positioning pole faces of a source of magnetic flux so that the flux path between them is at the angle of between 20 degrees and 70 degrees with respect to the magnetic material.

6. A method according to claim 5 in which the pole faces are stationary with respect to each other and the magnetic medium is moved with respect to the pole faces while maintaining an angle of the peak field between the pole faces between 20 degrees and 70 degrees with respect to the magnetic medium.

7. A method according to claim 1 in which the magnetic field and magnetic medium are rotated with respect to each other while maintaining an angle of the peak field density of between 20 degrees and 70 degrees to the magnetic material.

8. A method according to claim 1 in which a signal is recorded on the magnetic medium prior to degaussing, and the method of degaussing reduces energy transfer between even and odd harmonics of the recorded signal during degaussing whereby a fundamental and all harmonics are reduced on the magnetic medium below a predetermined level.

9. Apparatus for degaussing magnetic material comprising:

means for applying a magnetic field to the magnetic material with a flux density of at least 1,000 gauss and at an angle between 20 degrees and 70 degrees with respect to the magnetic medium; and means for alternating the field at a frequency of at least ten hertz for a sufficient time so that the flux density of at least 1,000 gauss passes through each portion of magnetic material having a signal recorded on it at the angle of between 20 degrees and 70 degrees for at least one and one-half cycles of the alternating field;

said means for applying magnetic material including a magnetic circuit having a single air gap wherein a high intensity field in the air gap is applied to the magnetic material.

10. Apparatus in accordance with claim 9 further comprising means for rotating the magnetic material while it is in the field.

11. Apparatus in accordance with claim 10 further comprising means for moving a series of magnetic cassettes into the field while maintaining the field at an effective angle.

12. Apparatus in accordance with claim 11 in which the means for moving includes a conveyor assembly.

\* \* \* \* \*